Patented July 27, 1926.

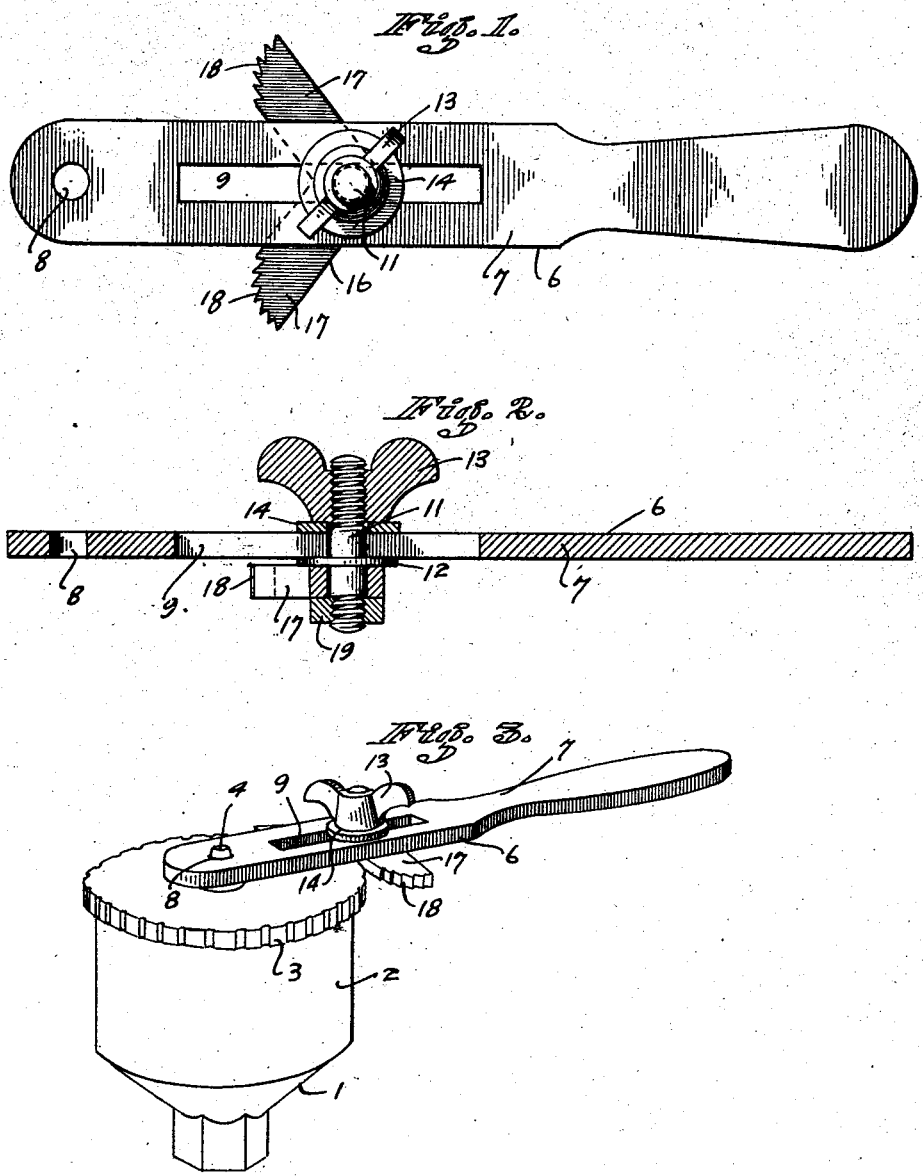

1,594,072

UNITED STATES PATENT OFFICE.

MATHEW JOHN SCHADECK, OF SPRECKELS, CALIFORNIA.

WRENCH.

Application filed August 20, 1923. Serial No. 658,445.

The present invention relates to improvements in wrenches and has particular reference to a wrench intended to be used for turning the caps on grease cups or the like. It often is very difficult to apply sufficient pressure when turning the cap of a grease cup by hand to force the grease into the bearing it is intended for and imperfect lubrication often is a result of this difficulty. My wrench is designed so as to be conveniently applied to any grease cup of any size within the range of the instrument and made to be readily used for tightening as well as loosening the cap. Further objects and advantages of my device will appear as the specification proceeds.

The preferred form of my invention is illustrated in the accompanying drawing, in which Figure 1 shows a plan view of my wrench, Figure 2 a longitudinal vertical section through the same, and Figure 3 a perspective view illustrating the use of my wrench. While I have shown only the preferred form of my invention, I wish to have it understood that various changes or modifications may be made within the scope of the claims hereto attached without departing from the spirit of the invention.

The grease cup (1) is provided with a cap (2) adapted to be threaded on the same and to thereby force grease provided in the cup into a bearing or the like, as shown in the drawing. The cap which is usually provided with a corrugated ring (3) as shown in Figure 3, for the purpose of facilitating its handling has a central stud (4) rising from its upper face.

My wrench (6) comprises a flat handle (7) perforated at one end as shown at (8) to pivotally engage the stud (4) and slotted as shown at (9) to slidably receive the pin (11). The latter is provided with a collar (12) engaging the bottom face of the handle while a wing nut (13) threadedly engages the upper end of the pin and bears down on a washer (14) provided between the nut and the top face of the handle. This arrangement allows the pin to be adjusted in any suitable position within the slot so as to allow the wrench to be used for a large number of grease cups of different sizes. Pivoted to the pin (11) below the collar (12) is a dog (16) having two arms (17) disposed at a suitable angle to one another and being toothed at the ends as shown at (18) so as to be adapted to engage with the corrugated ring (3) on the cap for the purpose of revolving the latter when the handle is turned. A nut (19) threadedly engaging the bottom end of the pin (11) holds the dog in position.

The manner of using my wrench should be readily understood from the foregoing description. The far end of the handle is slipped over the stud (4) and the pin (11) is adjusted within the slot by means of the wing nut (13) to bring the dog into a suitable position relative to the ring (3). If it is desired to tighten the cap the lower arm (17) of the dog, as viewed in Figure 1, is brought in contact with the ring (3) by means of the operator's thumb, whereupon the handle may be turned. To loosen the cap the other arm of the dog is engaged with the ring and the handle is turned in the opposite direction. It will be readily seen that the handle may either be turned to describe complete revolutions, or if not sufficient space is at the operator's disposal the handle may be advanced step-wise, the dog arrangement being such as to allow the handle to be worked back and forth, taking a new bite at each forward stroke.

I claim:

A wrench for a grease cup or the like having a central projection rising from its cap, comprising a handle perforated to pivotally engage the projection and having a longitudinal slot provided therein, a pin having means associated therewith for adjustably positioning the same in the slot, and a double acting dog pivoted to the pin presenting diverging outwardly curved ends positioned for selective frictional engagement with the peripheral edge of the cap with oppositely slanting teeth cut into the said ends allowing bites to be secured for revolving the cap when the handle is turned in the direction of the teeth.

MATHEW JOHN SCHADECK.